(12) United States Patent
Clayton

(10) Patent No.: US 10,208,718 B2
(45) Date of Patent: Feb. 19, 2019

(54) AIR INTAKE SYSTEM WITH MEMBRANE UNIT FOR SILOXANE REMOVAL

(71) Applicant: Caterpillar Inc., Peoria, IL (US)

(72) Inventor: Robert D. Clayton, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 78 days.

(21) Appl. No.: 15/391,397

(22) Filed: Dec. 27, 2016

(65) Prior Publication Data

US 2018/0179997 A1    Jun. 28, 2018

(51) Int. Cl.

| | |
|---|---|
| *F02M 35/024* | (2006.01) |
| *B01D 71/70* | (2006.01) |
| *F02B 37/00* | (2006.01) |
| *F02M 35/04* | (2006.01) |
| *F02B 29/04* | (2006.01) |
| *B01D 53/22* | (2006.01) |
| *B01D 69/08* | (2006.01) |
| *F02M 35/16* | (2006.01) |

(52) U.S. Cl.
CPC ....... *F02M 35/02475* (2013.01); *B01D 53/22* (2013.01); *B01D 69/08* (2013.01); *B01D 71/70* (2013.01); *F02B 29/0456* (2013.01); *F02B 37/00* (2013.01); *F02M 35/042* (2013.01); *B01D 2311/02* (2013.01); *B01D 2311/06* (2013.01); *B01D 2311/13* (2013.01); *F02M 35/164* (2013.01)

(58) Field of Classification Search
CPC .......... F02M 35/02475; F02M 35/042; F02M 35/164; B01D 71/70; B01D 69/08; B01D 53/22; B01D 2311/02; B01D 2311/13; B01D 2311/06; F02B 29/0456; F02B 37/00

USPC ................. 60/605.1, 605.2, 605.3
See application file for complete search history.

(56) References Cited

U.S. PATENT DOCUMENTS 4,370,150 A * 1/1983 Fenstermaker ........ B01D 53/22
                                                                    95/49
4,849,897 A * 7/1989 Ciccarone ........... F02D 41/0007
                                                                    123/564

(Continued)

FOREIGN PATENT DOCUMENTS

CN          104707458 A     6/2015

OTHER PUBLICATIONS

Montoya Patrick J. "Membrane Gas Exchange", using Hollow Membranes to Separate Gases from Liquid and Gaseous Streams.

*Primary Examiner* — Hoang Nguyen

(74) *Attorney, Agent, or Firm* — Miller, Matthias & Hull

(57) ABSTRACT

An air intake system for directing intake air to an internal combustion engine of a machine is disclosed. The air intake system may comprise an air compressor configured to increase a pressure of the intake air, and a membrane unit downstream of the air compressor and having a membrane with selectivity for siloxanes. The membrane may have a first side and a second side, and the first side may be exposed to a higher pressure than the second side when the air compressor is operating. The membrane may be configured to separate the intake air into a permeate that traverses the membrane from the first side to the second side, and a retenate that remains on the first side. The permeate may have a higher siloxane content than the retenate. The retenate may be directed to the internal combustion engine for combustion.

19 Claims, 6 Drawing Sheets

(56) References Cited

U.S. PATENT DOCUMENTS

| | | | |
|---|---|---|---|
| 5,730,780 A * | 3/1998 | Booth, III | B01D 53/22 95/51 |
| 7,264,648 B1 | 9/2007 | Wetzel et al. | |
| 7,815,713 B2 | 10/2010 | Sorensen et al. | |
| 8,221,524 B2 | 7/2012 | Mitariten | |
| 2004/0025507 A1* | 2/2004 | Leigh | B64D 37/32 60/608 |
| 2006/0112928 A1* | 6/2006 | Coleman | F02B 1/12 123/305 |
| 2011/0296809 A1 | 12/2011 | Brotherton | |
| 2016/0258392 A1* | 9/2016 | Harris | B01D 53/04 |

\* cited by examiner

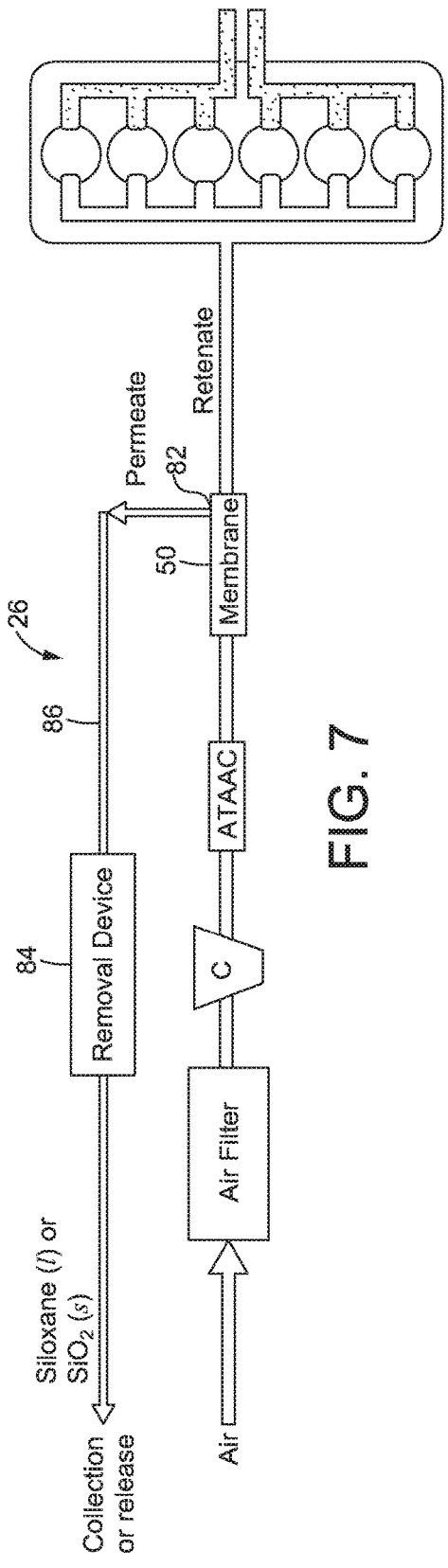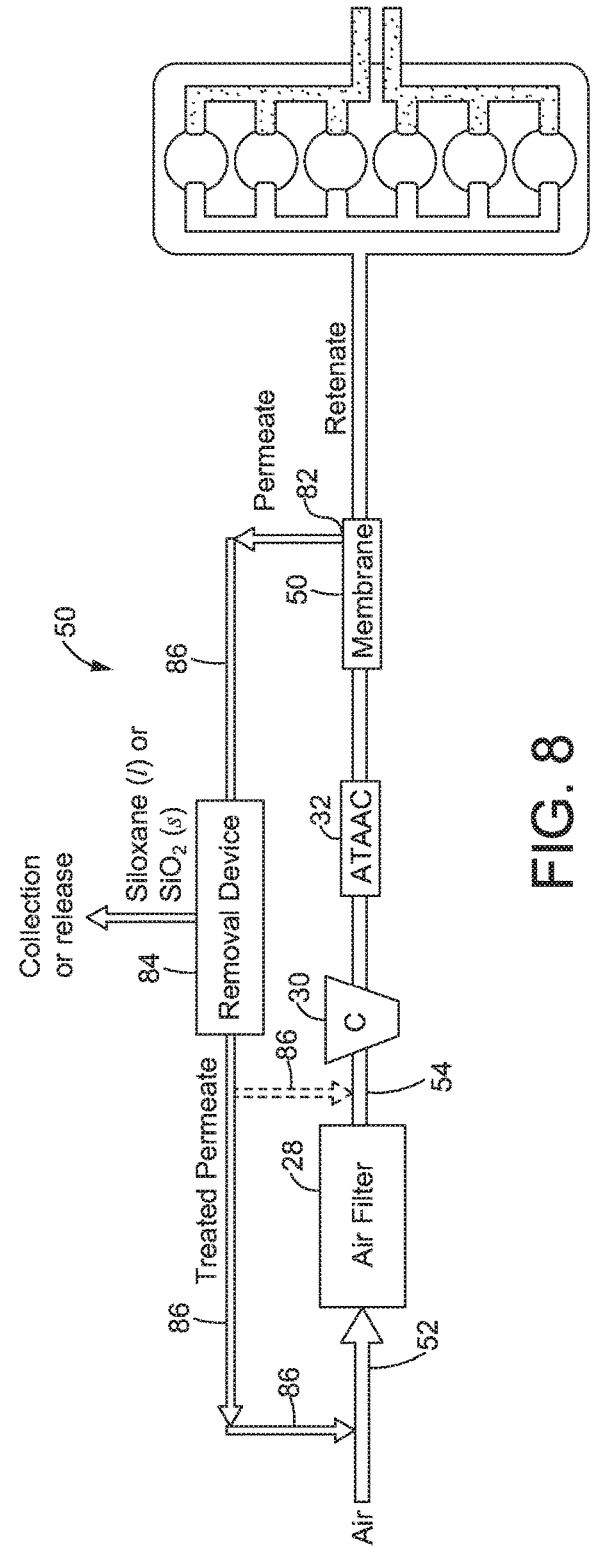

US 10,208,718 B2

AIR INTAKE SYSTEM WITH MEMBRANE UNIT FOR SILOXANE REMOVAL

TECHNICAL FIELD

The present disclosure generally relates to air intake systems for directing intake air to internal combustion engines and, more specifically, to air intake systems capable of at least partially removing siloxanes (and/or silanes or other gas phase contaminants) from the intake air prior to delivery of the intake air to the internal combustion engine.

BACKGROUND

Many machines and equipment operate in waste environments such as landfills, waste transfer stations, or recycling stations. In such waste environments, the local atmosphere may include airborne, gas phase siloxanes released from industrial or commercial products, such as electronic products and personal care products. When present in significant amounts, such airborne siloxanes may be inadvertently drawn into the machine's air intake system for combustion along with ambient intake air. Upon combustion, the siloxanes may produce silicon dioxide ($SiO_2$) which may coat engine parts (e.g., valves, turbocharger components, exhaust gas recirculation (EGR) components, etc.), enter the oil, and form deposits on components of the exhaust aftertreatment system such as the diesel oxidation catalyst (DOC) and the diesel particulate filter (DPF).

The coating of $SiO_2$ on engine parts may accelerate wear of the coated parts and reduce engine performance, and may interfere with the ability to overhaul/rebuild the engine. Moreover, exposure of EGR components to $SiO_2$ may lead to reduced heat transfer at the EGR cooler, as well as plugging of the EGR venturi and the EGR intake pressure sensor with $SiO_2$ deposits. Furthermore, prolonged exposure to $SiO_2$ in the exhaust aftertreatment system may lead to an increase in the rate of non-combustible accumulation in the DPF, face-plugging of the DOC and DPF with $SiO_2$ deposits, and increased back pressure. Sensors of the exhaust aftertreatment system (e.g., thermocouples, $NO_x$ sensors, etc.) may also become coated or plugged with $SiO_2$ deposits, leading to inaccurate readings or delayed response times. Consequently, high concentrations of siloxanes (e.g., >0.1 $mg/m^3$) in ambient air may undesirably increase machine downtime to replace parts as well as maintenance costs.

To reduce exposure of engine parts and aftertreatment components to $SiO_2$, some stationary machines may pretreat fuel going to the engine to remove siloxanes before combustion. However, such strategies may be impractical for application to mobile machines due to factors such as cost, restriction, service interval requirements, durability requirements, and packaging constraints.

In addition, U.S. Patent Application Publication Number 2016/0258392 discloses a siloxane filtration system to filter out siloxanes from intake air going to a diesel engine of a work vehicle. While effective, strategies providing effective gas phase separation of siloxanes from intake air are still desired. Clearly, there is a need for improved strategies for removing siloxanes from intake air for machines operating in waste environments.

SUMMARY

In accordance with one aspect of the present disclosure, an air intake system for directing intake air to an internal combustion engine of a machine is disclosed. The air intake system may comprise an air compressor configured to increase a pressure of the intake air, and a membrane unit downstream of the air compressor and having a membrane with a selectivity for siloxanes. The membrane may have a first side and a second side, and the first side may be exposed to a higher pressure than the second side when the air compressor is operating. The membrane may be configured to separate the intake air into a permeate that traverses the membrane from the first side to the second side, and a retenate that remains on the first side. The permeate may have a higher siloxane content than the retenate. The retenate may be directed to the internal combustion engine for combustion.

In accordance with another aspect of the present disclosure, a waste-handling machine is disclosed. The waste handing machine may comprise an internal combustion engine, and an air intake system configured to direct intake air to the internal combustion engine. The air intake system may include and air compressor configured to increase a pressure of the intake air. The machine may further comprise a membrane unit downstream of the air compressor in the air intake system. The membrane unit may have a membrane selective for siloxanes. In addition, the membrane may have a pressure differential thereacross, with a first side of the membrane exposed the intake air being at a higher pressure than a second side of the membrane when the air compressor is operating. The membrane may be configured to separate the intake air into a permeate and a retenate, with the permeate traversing the membrane from the first side to the second side, and the retenate remaining on the first side. The permeate may have a higher siloxane content than the retenate. The machine may further comprise a retenate conduit configured to direct the retenate to the internal combustion engine, and a permeate conduit configured to direct the permeate to a removal device. The removal device may be configured to at least partially remove the siloxanes from the permeate.

In accordance with another aspect of the present disclosure, a method for at least partially removing siloxanes from intake air flowing through an intake system of an engine is disclosed. The intake system may include an air compressor and a membrane having a selectivity for siloxanes downstream of the air compressor. The method may comprise applying a pressure differential across the membrane so that a first side of the membrane exposed to the intake air is at a higher pressure than a second side of the membrane. The method may further comprise separating the intake air into a permeate and a retenate with the membrane, wherein the permeate traverses the membrane from the first side to the second side and the retenate remains on the first side. The permeate may have a higher siloxane content than the retenate. The method may further comprise directing the retenate to the engine for combustion, and directing the permeate to a removal device configured to at least partially remove the siloxanes from the permeate.

These and other aspects and features of the present disclosure will be more readily understood when read in conjunction with the accompanying drawings.

BRIEF DESCRIPTION OF THE DRAWINGS

FIG. 7 is a schematic representation similar to FIG. 3, but with the permeate being directed to a removal device through a permeate conduit, constructed in accordance with the present disclosure.

FIG. 8 is a schematic representation similar to FIG. 7, but with the permeate conduit directing the permeate to a site upstream of the air compressor after treatment at the removal device, constructed in accordance with the present disclosure.

DETAILED DESCRIPTION

Figure 1:
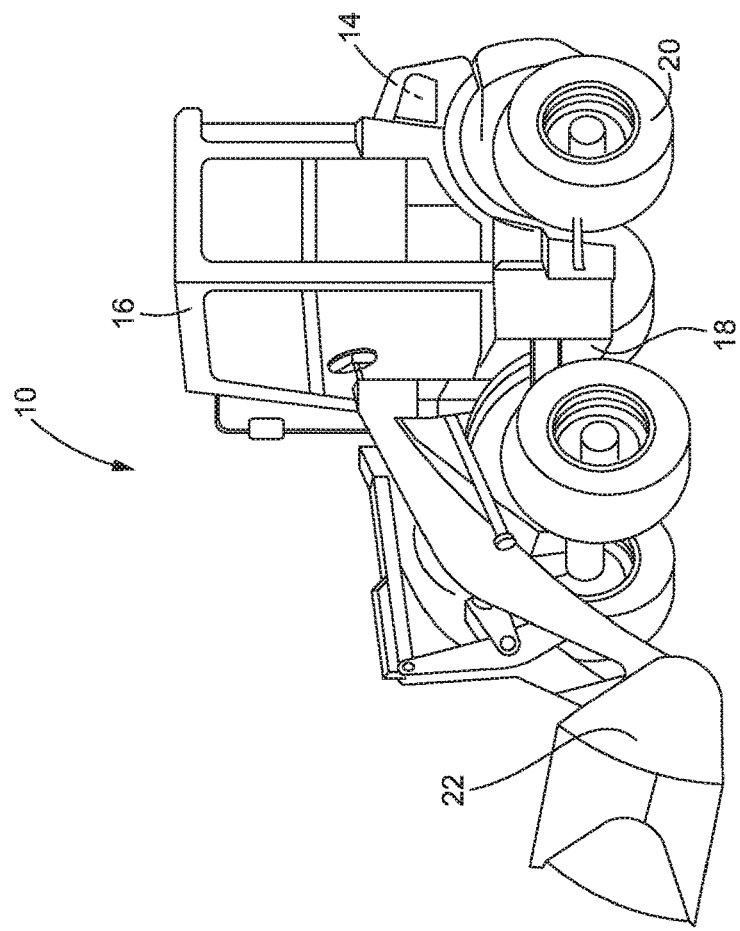
FIG. 1 is a side perspective view of a waste-handling machine, constructed in accordance with the present disclosure.

Referring now to the drawings, and with specific reference to FIG. 1, a waste-handling machine 10 is shown. The machine 10 may be a mobile machine that handles waste and operates in a waste environment such as, but not limited to, a landfill, a waste transfer station, or a recycling station. As one possibility, the machine 10 may be a wheel loader 12, although it may be other types of machines such as a compactor or a material-handling machine. The machine 10 may include an internal combustion engine 14 (also see FIG. 2), such as a diesel engine, an operator cab 16, a chassis 18 supporting wheels 20 or tracks, and an implement 22 for handling waste or other materials. In other arrangements, the machine 10 may be unmanned and lack an operator cab, or it may be a stationary machine. In any event, the machine 10 may be exposed to airborne siloxanes in the local atmosphere released from waste products such as electronic products and personal care products.

Figure 2:
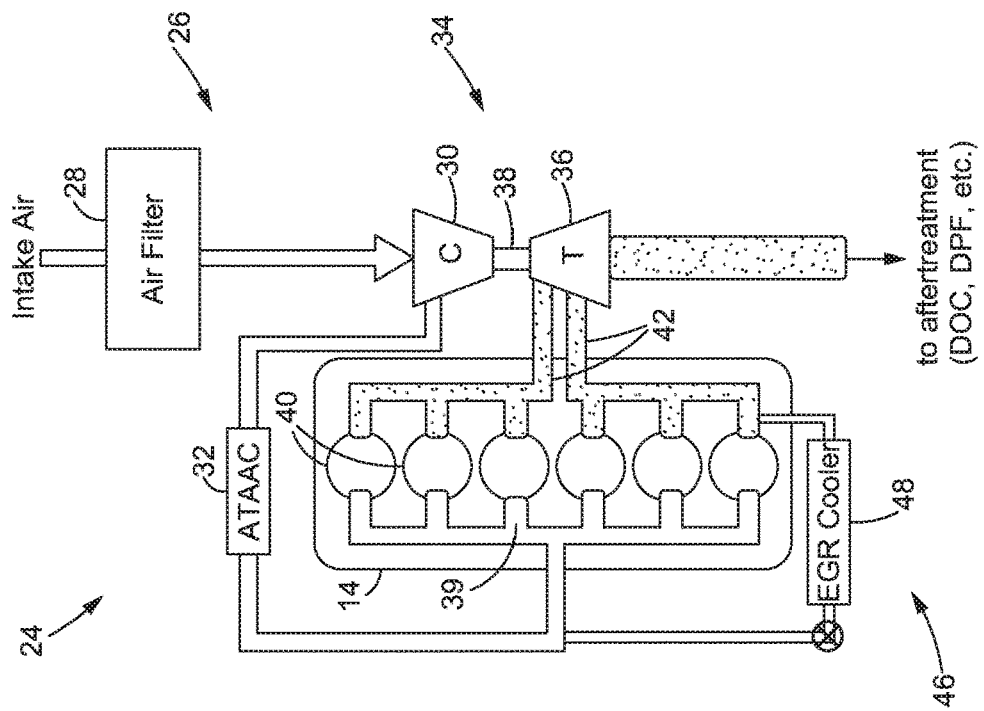
FIG. 2 is a schematic representation of an engine system of the machine, constructed in accordance with the present disclosure.

Referring to FIG. 2, an engine system 24 of the machine 10 is depicted. The engine system 24 may include an air intake system 26 that delivers intake air to the internal combustion engine 14. The air intake system 26 may include an air filter 28 to filter out particulates in the intake air, an air compressor 30 that pressurizes the intake air, and an air-to-air aftercooler (ATAAC) 32 that cools the pressurized air released from the air compressor 30 prior to delivery to the engine 14. The air compressor 30 may be part of a turbocharger 34 that includes the air compressor 30 and a turbine 36 linked to the air compressor 30 through an interconnecting shaft 38. The compressed and cooled intake air from the ATAAC 32 may be delivered through an intake manifold 39 to one or more combustion chambers 40 for combustion with fuel. Exhaust gases produced from combustion may be released from the chambers 40 through one or more exhaust lines 42 and may drive the rotation of the turbine 36 of the turbocharger 34. The turbine 36, in turn, may drive the rotation of the air compressor 30 through the interconnecting shaft 38, causing the air compressor 30 to draw in and pressurize more intake air. The exhaust gases leaving the turbine 36 may be directed to the aftertreatment system of the machine 10 through one or more exhaust lines 44. For instance, the aftertreatment system may include various catalysts and filtering systems apparent to those with ordinary skill in the art such as a diesel oxidation catalyst (DOC) to oxidize diesel pollutants in the exhaust gas, a diesel particulate filter (DPF) to filter out diesel particulate matter or soot from the exhaust gas, and/or a selective catalytic reduction (SCR) aftertreatment system for reducing nitrogen oxides ($NO_x$) in the exhaust gas. In addition, a portion of the exhaust gas may be recirculated back to the engine 14 through an exhaust gas recirculation (EGR) system 46, as will be understood by those with ordinary skill in the art. The EGR system 46 may include an EGR cooler 48 to cool the exhaust gases prior to reintroduction into the combustion chamber(s) 40.

If airborne siloxanes are present in the local atmosphere of the machine 10, the siloxanes may be drawn into the engine 14 through the air intake system 26 along with the intake air. Combustion of the siloxanes in the engine 14 may generate solid silicone dioxide ($SiO_2$) which may coat, form deposits on, and/or plug various components of the engine system 24, including the EGR system 46, and the aftertreatment system (e.g., the DOC, the DPF, sensors, thermocouples, etc.). As a result, such components may require more frequent replacements, undesirably increasing maintenance costs and machine downtime.

Figure 3:
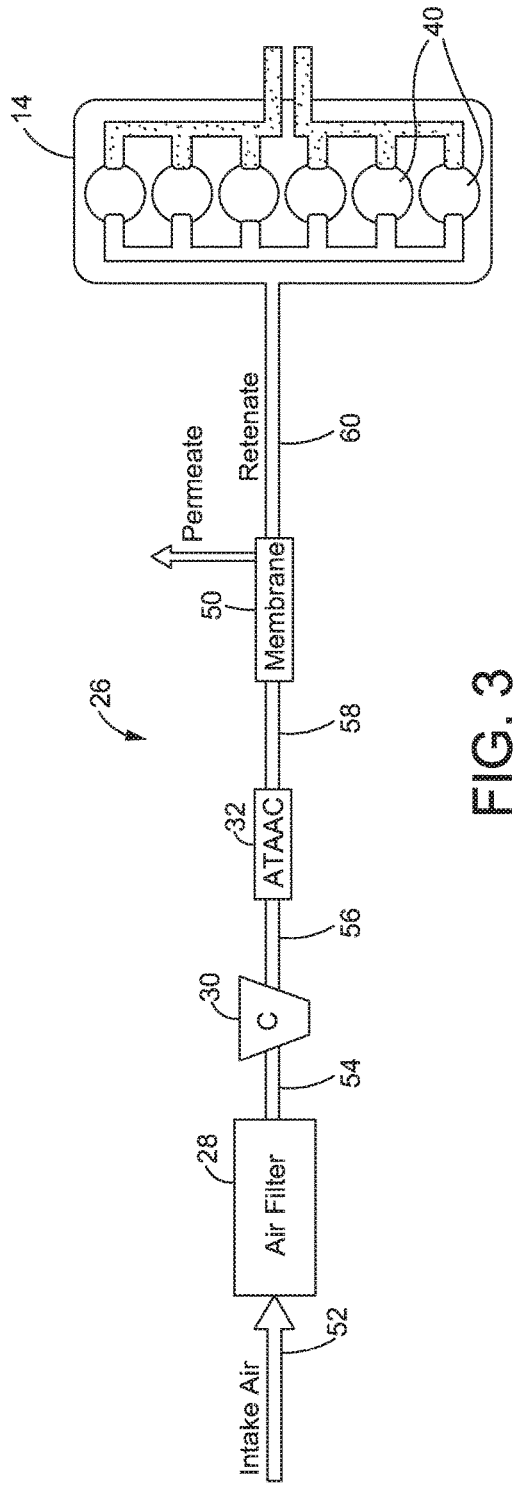
FIG. 3 is a schematic representation of an air intake system of the engine system having an air compressor, and a membrane unit downstream of the air compressor that separates the intake air into a permeate and a retenate, constructed in accordance with the present disclosure.

Referring now to FIG. 3, the air intake system 26 may be capable of at least partially removing any siloxanes in the intake air. Consequently, the production of $SiO_2$, and the formation of coatings, deposits, or plugs on or within components of the machine 10 may be advantageously avoided. Specifically, the air intake system 26 may include a membrane unit 50 located downstream of the air compressor 30 that at least partially separates gas phase siloxanes from the intake air prior to the introduction of the intake air to the combustion chambers 40. As explained in further detail below, placement of the membrane unit 50 downstream of the air compressor 30 takes advantage of high air pressures at the outlet of the air compressor 30 to create a pressure differential at the membrane unit 50 that drives the separation of siloxanes from the intake air. In some arrangements, the membrane unit 50 may also separate silanes or other gas phase contaminants from the intake air.

Referring still to FIG. 3, the air intake system 26 as disclosed herein may include at least one intake conduit 52 to direct the intake air to the air filter 28, at least one filter conduit 54 to direct the filtered intake air to the air compressor 30, at least one compressed air conduit 56 to direct compressed air from the air compressor to the ATAAC 32, and at least one cooled air conduit 58 to direct the cooled, compressed air to the membrane unit 50. As such, the membrane unit 50 may be positioned downstream of the ATAAC 32. Due to pressurization of the intake air at the air compressor 30, the conduits 52 and 54 upstream of the air compressor 30 may be at pressures below ambient pressure (or at sub-ambient pressures), whereas the conduits 56 and 58 downstream of the air compressor 30 may be at elevated pressures well above ambient pressure. The compressed air conduit 56 will be at a higher pressure than the cooled air conduit 58 due to the elevated temperature and its closer proximity to the air compressor 30. When the air compressor 30 is operating, the higher pressure at the outlet of the air compressor 30 may create a pressure differential at the membrane unit 50 that drives the separation of gas phase siloxanes (and/or silanes or other gas phase contaminants) from the intake air. Placement of the membrane unit downstream of the ATAAC 32, as shown in FIG. 3, may provide the membrane unit 50 with cooler intake air, which may improve separation efficiency.

The membrane unit 50 may separate the intake air into a gas phase permeate, enriched in siloxanes (and/or silanes or other gas phase contaminants), and a gas phase retenate, having a substantially lower siloxane content than the permeate. A retenate conduit 60 of the air intake system 26 may direct the retenate, at least partially purified of siloxanes, to the engine 14 for combustion. Depending on the efficiency of the membrane unit 50, the separation may be complete such that the permeate may be void of intake air, and the retenate may be void of siloxanes. In other arrangements, the separation may be less than complete, such that the permeate may include a fraction of intake air, and the retenate may include a fraction of siloxanes.

Figure 4:
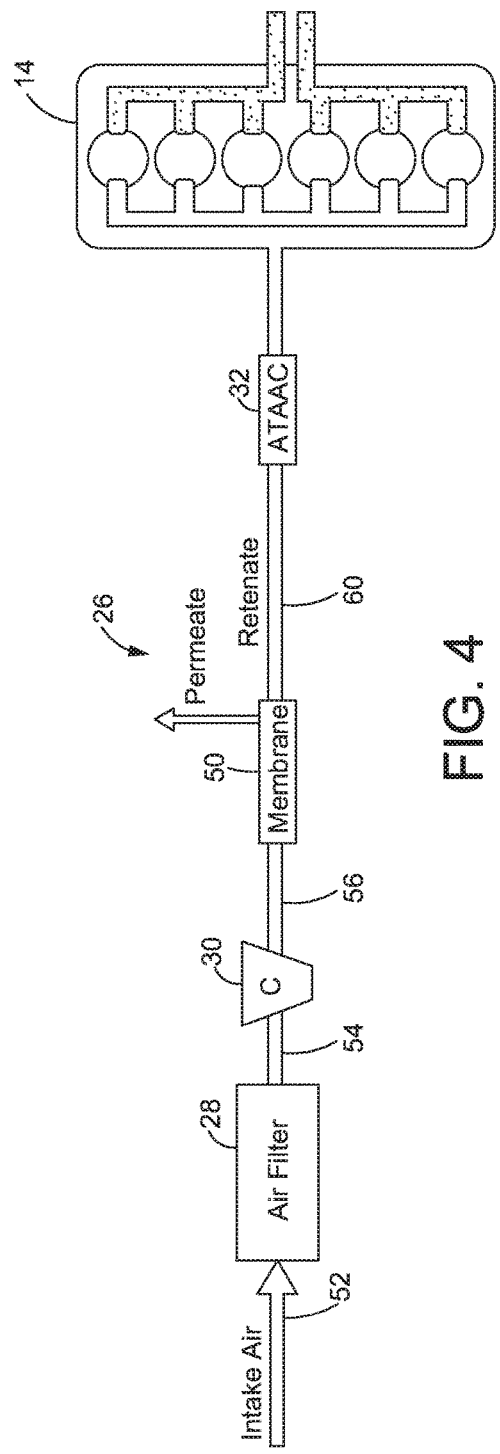
FIG. 4 is a schematic representation similar to FIG. 3 but with the membrane unit being located at a different position, constructed in accordance with the present disclosure.

In an alternative arrangement, the membrane unit 50 may be located upstream of the ATAAC 32, as shown in FIG. 4. Placement of the membrane unit 50 upstream of the ATAAC 32 may augment the pressure differential at the membrane unit 50 due to the closer proximity of the membrane unit 50 to the air compressor 30, possibly improving separation efficiency. Moreover, the membrane unit 50 upstream of the ATAAC 32 may be exposed to higher temperatures, which may increase siloxane separate rates, with possible reduction in selectivity. In this arrangement, the retenate exiting the membrane unit 50 through the retenate conduit 60 may first pass through the ATAAC 32 before being directed to the engine 14 for combustion.

Figure 5:
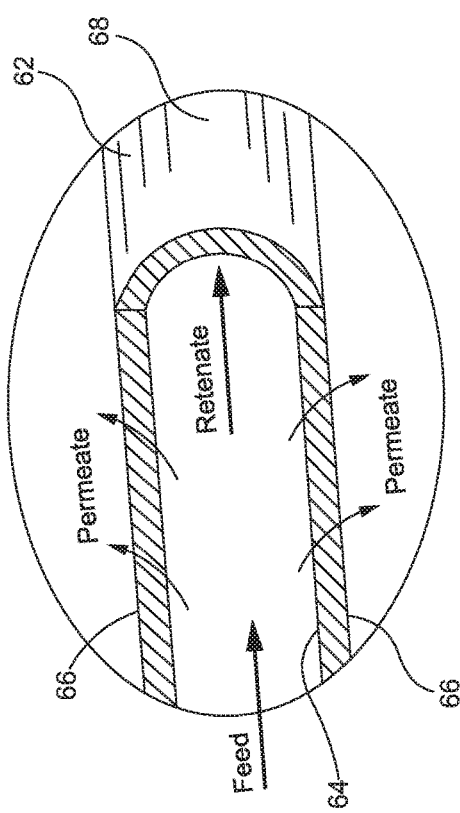
FIG. 5 is a partial cross-sectional view of a membrane of the membrane unit, constructed in accordance with the present disclosure.

Turning now to FIG. 5, the membrane unit 50 may include one or more membranes 62. As used herein, a "membrane" may be one or more layers of material that allows one gas phase substance to pass therethrough, while preventing the passage of another gas phase substance therethrough. The membrane 62 of the present disclosure may have a selectivity for gas phase siloxanes (and/or silanes or other gas phase contaminants) over the constituents of the intake air (i.e., oxygen, nitrogen, carbon dioxide, water, etc.). That is, gaseous siloxanes (and/or silanes or other gas phase contaminants) may have a higher permeability coefficient in the membrane 62 than the constituents of the intake air. The membrane 62 may have a first side 64 exposed to pressurized intake air from the air compressor 30, and a second side 66 exposed to ambient pressure or sub-ambient pressures. This pressure differential provides a driving force for the separation of the intake air into the permeate (having a higher siloxane content) that traverses the membrane 62 from the first side 64 to the second side 66, and a retenate (having a lower siloxane content) that remains on the first side 64. The membrane 62 may be a dense membrane, a porous membrane, or combinations thereof. As one possibility, the membrane 62 may be a dense membrane formed from polydimethyl siloxane (PDMS), although other types of dense and/or porous membranes may certainly be used as well.

Figure 6:
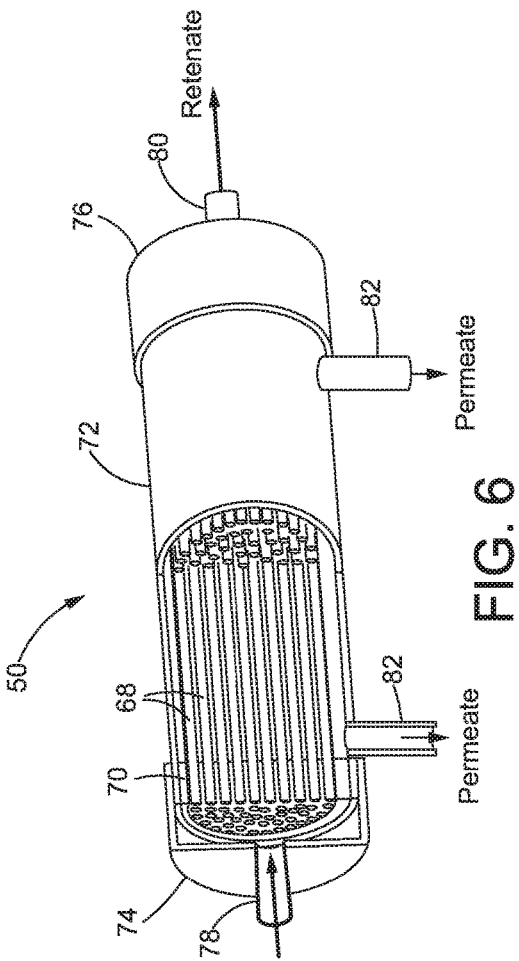
FIG. 6 is a partial cross-sectional view of the membrane unit, constructed in accordance with the present disclosure.

As shown in FIG. 6, the membrane unit 50 may include a plurality of the membranes 62 each individually formed as a hollow fiber tube 68, and packaged in a compact bundle to increase the total surface area of the membrane 62 and improve separation. At each end of the bundled hollow fiber tubes 68 may be a cap 70 that permits fluid communication between the first side 64 of the membrane 62 and the pressurized intake air coming off of the air compressor 30, while sealing the second side 66 of the membrane 62 from exposure to the pressurized intake air. The bundled hollow fiber tubes 68 and caps 70 may be encased in a housing 72 that assembles with first and second end caps 74 and 76 at both ends of the housing 72. The first end cap 74 may define an inlet 78 for the intake air, and the second end cap 80 may define an outlet 80 for the retenate. The inlet 78 may be in fluid communication with the cooled air conduit 58 (FIG. 3) or the compressed air conduit 56 (FIG. 4), and the outlet 80 may be in fluid communication with the retenate conduit 60. In addition, along the body of the housing 72 may be one or more permeate outlets 82 in fluid communication with the second side 66 of the membrane 62 that permits the siloxane-containing permeate to exit the membrane unit 50. In alternative configurations of the membrane unit 50, the membrane 62 may have different structures such as a sheet-like structure or another structure. In addition, in some arrangements, the air intake system 26 may have two or more membrane units 50 arranged in sequence.

The permeate may be released directly to the surrounding environment through the permeate outlet(s) 82, such as to the atmosphere or under a hood of the machine 10 (see FIGS. 3-4). Alternatively, as shown in FIG. 7, the permeate may instead be directed to a removal device 84 through a permeate conduit 86 in fluid communication with the permeate outlet(s) 82 of the membrane unit 50 (see FIG. 7). The removal device 84 may include a condenser or cooler that condenses the gaseous siloxanes (and/or silanes or other gas phase contaminants) in the permeate to a liquid state for collection and removal from the system 26. In an alternative implementation, the removal device 84 may be a burner that oxidizes the siloxanes to solid, silicon dioxide ($SiO_2$) for collection and removal from the system 26. In other arrangements, the removal device 84 may include a combination of a condenser (or cooler) and a burner. In any event, the removal device 84 may convert the siloxanes to a liquid state (siloxanes (l)) and/or a solid product ($SiO_2$ (s)) that is more readily collectable than gaseous siloxanes. Alternatively, the liquid siloxanes and/or the solid $SiO_2$ may not be collected, and may be released from the engine system 24 to the surrounding atmosphere or under a hood of the machine 10.

As yet another possibility, the permeate conduit 86 may direct the treated permeate not processed by the removal device 84 (such as intake air or trace amounts of siloxanes not completely processed by the removal device 84) to a site upstream of the air compressor 30, as shown in FIG. 8. As used herein, "treated permeate" refers to the remaining permeate after treatment at the removal device 84. For instance, the permeate conduit 86 may direct the treated permeate to the intake conduit 52 upstream of the air filter 28 (see FIG. 8, solid arrow) to place the second side 66 of the membrane 62 in fluid communication with the intake conduit 52. In an alternative implementation, the permeate conduit 86 may direct the treated permeate to the filter conduit 54 downstream of the air filter 28 (see FIG. 8, dashed arrow) to place the second side 66 of the membrane 62 in fluid communication with the filter conduit 54. In either case, directing the treated permeate upstream of the air compressor 30 may advantageously increase the pressure differential across the membrane by exposing the second side 66 of the membrane 62 to sub-ambient pressures, thereby promoting the diffusion of the siloxanes across the membrane 62 and enhancing the efficiency of separation (see FIG. 5). Directing the treated permeate to the filter conduit 54 downstream of the air filter 28 may be favored, for example, if the removal device 84 is a burner and the treated permeate contains trace amounts of solid $SiO_2$ that could be separated in the air filter 28.

Figure 9:
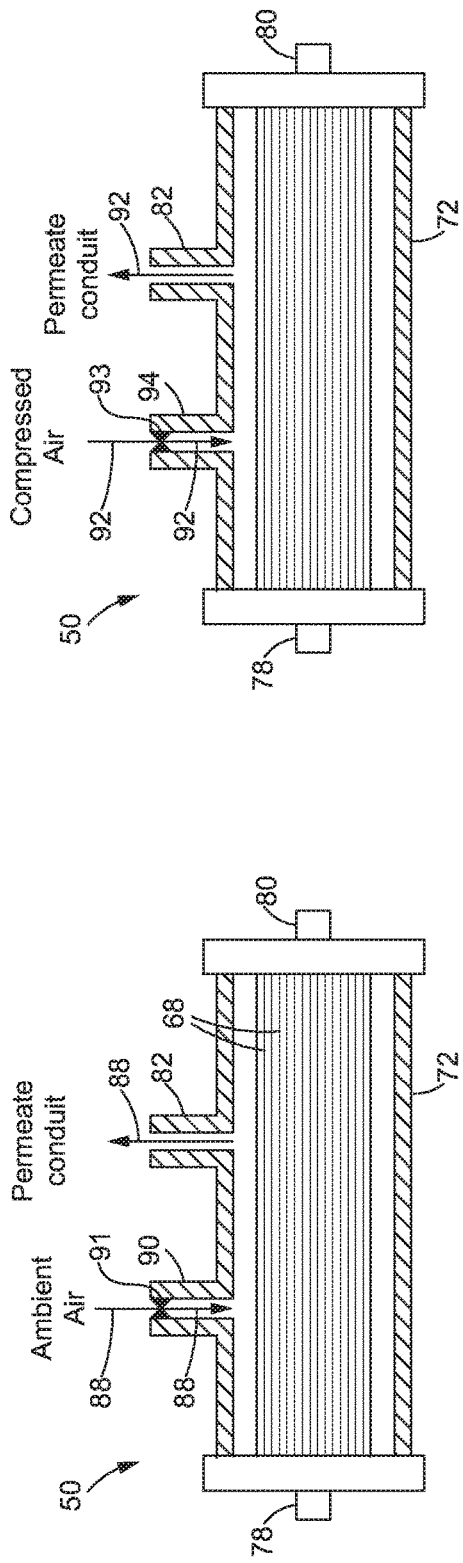
FIG. 9 is a partial cross-sectional view of the membrane unit having an air sweep, constructed in accordance with the present disclosure.

To further enhance the separation efficiency of the membrane 62, the membrane unit 50 may further include an air sweep 88 of ambient air that flows across the second side 66 of the membrane 62 and out through the permeate outlet 82 (or another outlet), as shown in FIG. 9. More specifically, the air sweep 88 may convectively remove the siloxanes that diffused through the membrane 62 to the second side 66 to reduce the concentration of siloxanes on the second side 66, further driving diffusion of siloxanes across the membrane 62. For example, the air sweep 88 may be drawn into the membrane unit 50 through a port 90 along the housing 72 of the membrane unit 50 using the sub-ambient pressures at the permeate outlet 82/permeate conduit 86 when the permeate conduit 86 is connected upstream of the air compressor 30 (also see FIG. 8). The port 90 may be open to ambient air, and may include a valve 91 to control the flow rate of the air sweep 88.

Figure 10:
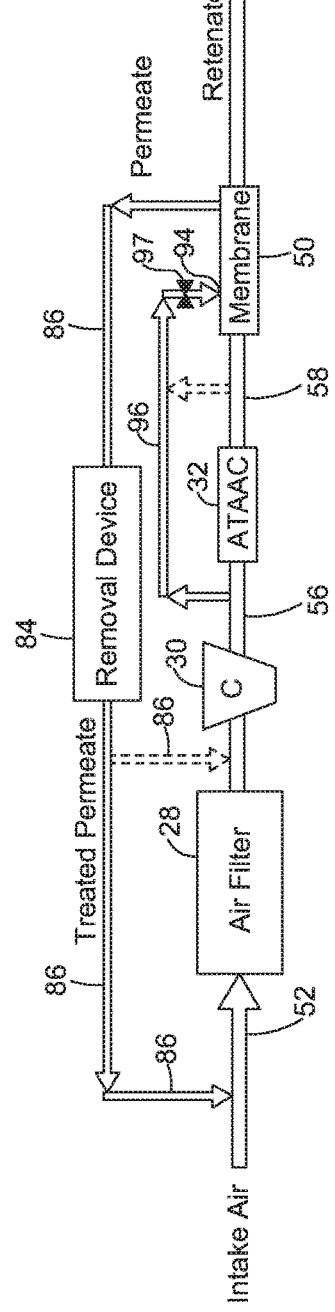
FIG. 10 is a partial cross-sectional view of the membrane unit similar to FIG. 9, but having a compressed air sweep, constructed in accordance with the present disclosure.

In an alternative arrangement shown in FIG. 10, the membrane unit 50 may include a compressed air sweep 92 of compressed intake air from the air compressor 30 that flows across the second side 66 of the membranes 62 and out through the permeate outlet 82 (or another outlet). Similar to the air sweep 88, the compressed air sweep 92 may convectively remove siloxanes that diffused across the membrane 62 to reduce the concentration of siloxanes on the second side 66, and drive diffusion of the siloxanes across the membrane 62. The compressed air sweep 92 may enter the membrane 62 through a port 94 along the housing 72 and may flow across the second side 66 of the membrane 62 to sweep out siloxanes through the permeate outlet 82 and the permeate conduit 86. The compressed air sweep 92 may be drawn into the membrane unit 50 and across the second side 66 using the sub-ambient pressures at the permeate outlet 82/permeate conduit 86 when the permeate conduit 86 is connected upstream of the air compressor 30 (also see FIG. 8). To control the flow rate of the compressed air sweep 92, the port 94 may include a valve 93. As the flow rate of the compressed air sweep 92 increases, more siloxanes will be removed; however, the energy requirement for siloxane removal at the removal device 84 will also increase. As such, there may be a trade-off between siloxane removal efficiency (sweep flow rate) and the energy requirement at the removal device.

Figure 11:
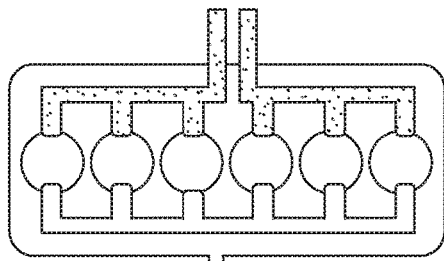
FIG. 11 is a schematic representation similar to FIG. 7-8, but showing a flow path of compressed air to the compressed air sweep, constructed in accordance with the present disclosure.

As shown in FIG. 11, the port 94 may be in fluid communication with a conduit 96 in fluid communication with the compressed air conduit 56 (solid arrow) and/or the cooled air conduit 58 (dashed arrow), to allow a portion of the compressed air flowing through the compressed air conduit 56 and/or the cooled air conduit 58 to be forced through the membrane unit 50. The conduit 96 may include a valve 97 to regulate the flow of compressed air therethrough and avoid depriving the engine 14 of compressed air flow. The valve 97 may be a restriction to cause a pressure drop so that the pressure of the compressed air sweep 92 is substantially lower than the compressor outlet pressure.

In addition to the above, the air intake system 26 as disclosed herein may include various combinations of any of the aforementioned arrangements. For example, the air intake system 26 may include the removal device 84 (see FIG. 7) with the membrane unit 50 being located upstream of the ATAAC 32 (see FIG. 4). Likewise, the permeate conduit 86 may direct the permeate to the intake conduit 52 or to the filter conduit 54 (see FIG. 8), with the membrane unit 50 being located upstream of the ATTAC 32 (see FIG. 4). In addition, the membrane unit 50 may be located upstream of the ATTAC 32 (see FIG. 4), and may include the air sweep 88 (see FIG. 9) or the compressed air sweep 92 (see FIG. 10). Variations such as these, as well as others, also fall within the scope of the present disclosure.

INDUSTRIAL APPLICABILITY

In general, the teachings of the present disclosure may find broad applicability in many industries including, but not limited to, waste handling industries. For example, the present disclosure may find applicability in any industry using machines or equipment that operate in a local environment having airborne siloxanes, silanes, or other gas phase contaminants.

Figure 12:
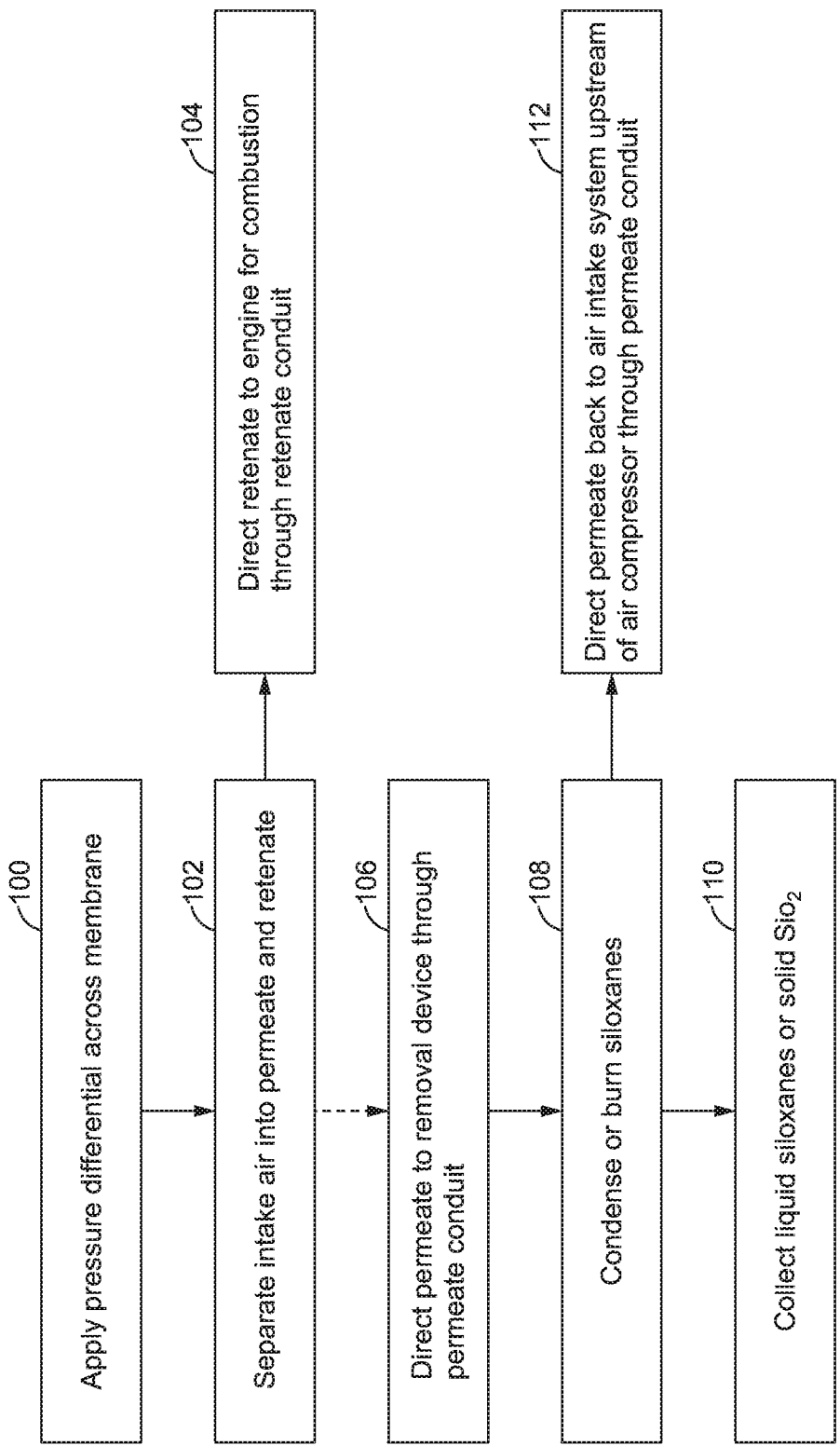
FIG. 12 is a flowchart of a series of steps involved in removing siloxanes from the intake air using the air intake system, in accordance with a method of the present disclosure.

Referring to FIG. 12, a series of steps that may be involved in removing airborne siloxanes (and/or silanes or other gas phase contaminants) from the intake air using the air intake system 26 is shown. At a first block 100, when the air compressor 30 is operating, a pressure differential may be applied across the membrane(s) 62 of the membrane unit 50, with the first side 64 of the membrane 50 being exposed to higher pressures from the compressed intake air, and the second side 66 of the membrane 50 being exposed to ambient pressure or sub-ambient pressures if the permeate conduit 86 is connected upstream of the air compressor 30. The pressure differential may provide a driving force for the diffusion of gas phase siloxanes (and/or silanes, gas phast contaminants, etc.) in the intake air across the membrane 62 from the first side 64 to the second side 66 (also see FIG. 5). In this way, the intake air may be separated by the membrane 50 into the retenate (with a lower concentration of siloxanes and/or other gas phase contaminants) that remains on the first side 64, and a permeate (with a higher concentration of siloxanes) that traverses the membrane 62 from the first side 64 to the second side 66 (block 102). Separation of the intake air according to the block 102 may be further facilitated using the air sweep 88 (FIG. 9) or the compressed air sweep 92 (FIG. 10), as described above.

The first side 64 of the membrane 62 may be in fluid communication with the retenate conduit 60, permitting the retenate, at least partially purified of siloxanes, to be directed to the engine 14 for combustion through the retenate conduit 60 according to a block 104. According to an optional block 106, the permeate on the second side 66 of the membrane 62 may be directed to the removal device 84 through the permeate conduit 86. As explained above, the removal device 84 may include a condenser or cooler that condenses the gaseous siloxanes to a liquid state, or it may include a burner that oxidizes the gaseous siloxanes to solid $SiO_2$ (block 108). As such, the liquid siloxanes or solid $SiO_2$ may be collected and removed from the system 26 (block 110), while the treated permeate not processed by the removal device 84 (including intake air or trace amounts of gaseous siloxanes not completely processed by the removal device 84) may be directed back to a site of the air intake system 26 upstream of the air compressor 30 through the permeate conduit 86 (block 112). As explained above, directing the treated permeate upstream of the air compressor 30 may expose the second side 66 of the membrane to sub-ambient pressures, thereby augmenting the pressure differential across the membrane 62 and enhancing separation. In other arrangements, the remaining permeate not processed by the removal device 84 may be released to the surrounding environment, such as to the atmosphere or under a hood of the machine 10. In yet other arrangements, the permeate may not be directed to the removal device 84 and may be released into the atmosphere or under a hood of the machine 10.

The air intake system disclosed herein includes a membrane unit with one or more membranes that are selective for siloxanes, allowing gas phase siloxanes inadvertently drawn into the air intake system to be at least partially separated from the intake air prior to introduction of the intake air to the combustion chamber. Accordingly, the combustion of the siloxanes to $SiO_2$ in the combustion chamber, as well as resulting $SiO_2$ deposits or plugs on or within components of the engine, the exhaust aftertreatment system (e.g., the DOC, the DPF, thermocouples, sensors, etc.), and/or the EGR system, may be advantageously avoided. In the air intake system disclosed herein, the membrane unit is strategically positioned downstream of the air compressor to create a pressure differential across the membrane, with one side of the membrane exposed to high pressure intake air on the outlet side of the air compressor, and the other side of the membrane exposed to ambient or sub-ambient pressures. The pressure differential across the membrane may drive the diffusion of siloxanes across the membrane, and enhance the efficiency of siloxane separation. In some implementations, the air intake system may include a removal device that condenses the separated siloxanes to a liquid state, or oxidizes the separated siloxanes to solid $SiO_2$, allowing the separated siloxanes to be collected and removed from the system.

It is expected that the technology disclosed herein may find wide industrial applicability in a wide range of areas such as, but not limited to, waste-handling machine or equipment applications.

What is claimed is:

1. An air intake system for directing intake air to an internal combustion engine of a machine, comprising:
   an air compressor configured to increase a pressure of the intake air; and
   a membrane unit downstream of the air compressor and having a membrane with a selectivity for siloxanes, the membrane having a first side and a second side, the first side being exposed to a higher pressure than the second side when the air compressor is operating, the membrane being configured to separate the intake air into a permeate that traverses the membrane from the first side to the second side, and a retenate that remains on the first side, the permeate having a higher siloxane content than the retentate, the retenate being directed to the internal combustion engine for combustion; and
   at least one permeate conduit configured to direct the permeate released from the membrane unit upstream of the air compressor in the air intake system.

2. The air intake system of claim 1, wherein the first side of the membrane is exposed to pressurized intake air from the air compressor when the air compressor is operating.

3. The air intake system of claim 2, wherein the membrane unit further includes an air sweep configured to flow ambient air across the second side of the membrane.

4. The air intake system of claim 2, wherein the membrane unit further comprises a compressed air sweep configured to flow compressed air from the air compressor across the second side of the membrane.

5. The air intake system of claim 2, wherein the membrane unit includes at least one inlet for the intake air from the air compressor, at least one permeate outlet for release of the permeate, and at least one retenate outlet for release of the retenate, the retenate outlet being in fluid communication with a retenate conduit configured to direct the retenate to the internal combustion engine.

6. The air intake system of claim 5, wherein the air intake system further comprises an air filter upstream of the air compressor, and an air-to-air aftercooler downstream of the air compressor.

7. The air intake system of claim 5, wherein the membrane unit is upstream of the air-to-air aftercooler.

8. The air intake system of claim 5, wherein the membrane unit is downstream of the air-to-air aftercooler.

9. The air intake system of claim 5, further comprising:
   at least one intake conduit configured to direct the intake air to the air filter; and
   at least one filter conduit configured to direct the intake air from the air filter to the air compressor, the intake conduit and the filter conduit being at sub-ambient pressures when the air compressor is operating.

10. The air intake system of claim 9, wherein the at least one permeate conduit is in fluid communication with the permeate outlet and is configured to direct the permeate released from the permeate outlet to the intake conduit, the permeate conduit placing the second side of the membrane in fluid communication with the intake conduit so that the second side of the membrane is at sub-ambient pressures when the air compressor is operating.

11. The air intake system of claim 9, wherein the at least one permeate conduit is in fluid communication with the permeate outlet and is configured to direct the permeate released from the permeate outlet to the filter conduit, the permeate conduit placing the second side of the membrane in fluid communication with the filter conduit so that the second side of the membrane is at sub-ambient pressures when the air compressor is operating.

12. The air intake system of claim 10, wherein the permeate conduit includes at least one removal device configured to at least partially remove the siloxanes from the permeate.

13. A waste-handling machine, comprising:
   an internal combustion engine;
   an air intake system configured to direct intake air to the internal combustion engine, the air intake system including an air compressor configured to increase a pressure of the intake air;
   a membrane unit downstream of the air compressor in the air intake system, the membrane unit having a membrane selective for siloxanes, the membrane having a pressure differential thereacross with a first side of the membrane that is exposed to the intake air being at a higher pressure than a second side of the membrane when the air compressor is operating, the membrane being configured to separate the intake air into a permeate and a retenate, the permeate traversing the membrane to the second side and the retenate remaining on the first side, the permeate having a higher siloxane content than the retenate;
   a retenate conduit configured to direct the retenate to the internal combustion engine; and
   a permeate conduit configured to direct the permeate to a removal device, the removal device being configured to at least partially remove the siloxanes from the permeate, the permeate conduit being further configured to direct a treated permeate after treatment at the removal device to a position upstream of the air compressor in the air intake system.

14. The waste-handling machine of claim 13, wherein the removal device is a condenser configured to condense the siloxanes to a liquid state.

15. The waste-handling machine of claim 13, wherein the removal device is a burner configured to oxidize the siloxanes to solid silicon dioxide ($SiO_2$).

16. The waste-handling machine of claim 13, wherein, when the air compressor is operating, the first side of the membrane is exposed to the pressurized intake air from the air compressor and the second side of the membrane is exposed to sub-ambient pressures.

17. The waste-handling machine of claim 16, wherein the membrane unit further comprises an air sweep configured to sweep ambient air across the second side of the membrane.

18. A method for at least partially removing siloxanes from intake air flowing through an air intake system of an engine, the air intake system including an air compressor and a membrane having a selectivity for the siloxanes, the membrane being downstream of the air compressor, the method comprising:

applying a pressure differential across the membrane so that a first side of the membrane exposed to the intake air is at a higher pressure than a second side of the membrane;

separating the intake air into a permeate and a retenate with the membrane, the permeate traversing the membrane from the first side to the second side and having a higher siloxane content than the retenate, the retenate remaining on the first side;

directing the retenate to the engine for combustion;

directing the permeate to a removal device configured to at least partially remove the siloxanes from the permeate; and directing a treated permeate after treatment at the removal device to a position upstream of the air compressor in the air intake system.

19. The method of claim 18, wherein applying the pressure differential across the membrane comprises using the air compressor to pressurize the intake air so that the first side of the membrane is at a higher pressure than the second side of the membrane.

* * * * *